(12) United States Patent
Aoyama et al.

(10) Patent No.: US 10,043,045 B1
(45) Date of Patent: Aug. 7, 2018

(54) ELECTRONIC APPARATUS

(71) Applicant: Panasonic Intellectual Property Management Co., Ltd., Osaka (JP)

(72) Inventors: Shinya Aoyama, Kanagawa (JP); Shinji Tomobe, Kanagawa (JP); Katsuhiro Kitade, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/883,033

(22) Filed: Jan. 29, 2018

(30) Foreign Application Priority Data

Aug. 10, 2017 (JP) .................. 2017-155821

(51) Int. Cl.
*G06K 7/08* (2006.01)
*G06K 7/14* (2006.01)
*G06K 7/10* (2006.01)

(52) U.S. Cl.
CPC ............ *G06K 7/089* (2013.01); *G06K 7/087* (2013.01); *G06K 7/10722* (2013.01); *G06K 7/10881* (2013.01); *G06K 7/1413* (2013.01); *G06K 2007/10524* (2013.01)

(58) Field of Classification Search
USPC ................................................ 235/380, 449
See application file for complete search history.

(56) References Cited

U.S. PATENT DOCUMENTS

| | | | |
|---|---|---|---|
| 8,640,953 B2 * | 2/2014 | Dorsey | G06K 7/082 235/449 |
| 2011/0198395 A1 * | 8/2011 | Chen | G06K 7/084 235/380 |

FOREIGN PATENT DOCUMENTS

| | | |
|---|---|---|
| JP | 6-150074 | 5/1994 |
| JP | 6-348653 | 12/1994 |

* cited by examiner

*Primary Examiner* — Rafferty Kelly
(74) *Attorney, Agent, or Firm* — Greenblum & Bernstein, P.L.C.

(57) ABSTRACT

An electronic apparatus includes a terminal main body, a lid member that is removable from the terminal main body, and a battery that is accommodated in the terminal main body. The electronic apparatus has a first end and a second end, and a first main body and a second main body that has a thickness smaller than that of the first main body are disposed from the first end toward the second end. A reading device is provided at a first position of the first main body, and a magnetic card reader is provided at a second position of the first main body. In the magnetic card reader a slot through which a magnetic stripe of a magnetic card passes is provided, and the slot is defined in an inclined state such that the thickness of the electronic apparatus due to the magnetic card reader is prevented.

6 Claims, 6 Drawing Sheets

ELECTRONIC APPARATUS

BACKGROUND

1. Technical Field

The present disclosure relates to an electronic apparatus including a magnetic card reader.

2. Description of the Related Art

In recent years, in a business electronic apparatus, there is a need to provide a magnetic card reader that reads a magnetic card in addition to a reading device such as a bar-code reader, and an electronic apparatus including the magnetic card reader is known (see Japanese Patent Unexamined Publication No. 6-150074 (PTL 1) and Japanese Patent Unexamined Publication No. 6-348653 (PTL 2)).

PTL 1 discloses a magnetic card processing device including a magnetic card reader that reads information on a magnetic card, which promotes speed-up of verification of the magnetic card and protection of users by preventing crime. PTL 2 discloses a compact electronic apparatus that includes a data display and a keyboard on the front side, allows an optional apparatus to be mounted on the back side, and can be operated while gripping the position from the back side to the vicinity of the center of gravity with a palm, in which excellent usability is provided and the balance of shape and weight is maintained so that operation is easily performed by being held in the palm while the optional apparatus is mounted on the apparatus main body.

SUMMARY

In PTL 1 and PTL 2, the magnetic card reader and a slot through which a magnetic card passes are provided at the end portion of the electronic apparatus, but there is a problem that operability is poor due to increase in the size of the electronic apparatus and interference of one hand, and so on.

An object of the present disclosure is to provide an electronic apparatus that enables smooth magnetic stripe sliding operation while preventing an increase in size (thickness).

An electronic apparatus of the present disclosure includes: a terminal main body, a reading device that reads external information, and a magnetic card reader that has a slot through which a magnetic stripe of a magnetic card passes. The terminal main body includes a first main body disposed on a side of a first end of the terminal main body, a second main body disposed on a side of a second end of the terminal main body and having a thickness smaller than that of the first main body, and a first surface on which at least a display is disposed and a second surface opposite to the first surface. The reading device is provided at a first position adjacent to the first end of the first main body, the magnetic card reader is provided at a second position which is closer to the second main body than the first position is in the first main body, the slot is defined in a state of being inclined so as to be directed from the second surface toward the first surface along a direction from the first end to the second end in the first main body, a region of the first main body adjacent to the second main body in the second surface forms an inclined surface that is inclined so as to be directed from the second surface toward the first surface along the direction from the first end to the second end, and the slot is defined to be inclined in the same direction as the inclined surface from the second surface.

According to the present disclosure, the magnetic card reader and the slot can be provided using the shape of the thick first main body. Therefore, it is possible to prevent the increase in thickness due to the magnetic card reader of the electronic apparatus. In addition, it is possible to avoid the interference of the magnetic card and one hand sliding the magnetic card with the other hand holding the reading device and the electronic apparatus.

DETAILED DESCRIPTION

Hereinafter, one exemplary embodiment in which an electronic apparatus according to the present disclosure is specifically disclosed (hereinafter, referred to as "present exemplary embodiment") will be described in detail with reference to drawings as appropriate. However, more detailed description than necessary will be omitted in some cases. For example, the detailed description of well-known matters and repeated description of substantially the same configuration may be omitted. This is for avoiding unnecessary repeating of the following description and facilitating the understanding of those skilled in the art. It is noted that the accompanying drawings and the following description are provided to enable those skilled in the art to fully understand the present disclosure, and are not intended to limit the claimed subject matter.

Hereinafter, an exemplary embodiment for carrying out the present disclosure will be described with reference to the drawings.

Figure 1A:
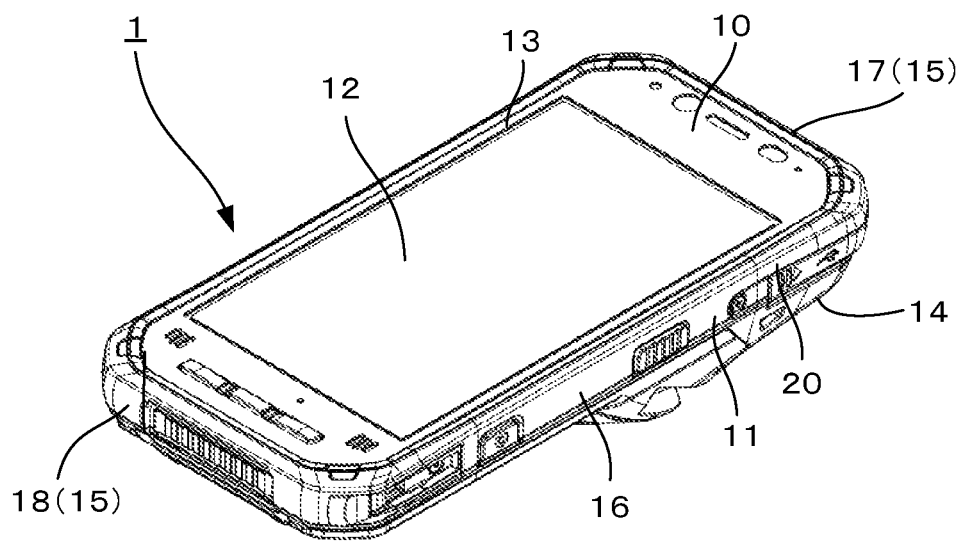
FIG. 1A is a front perspective view illustrating one example of an electronic apparatus according to the present disclosure.
Figure 1B:
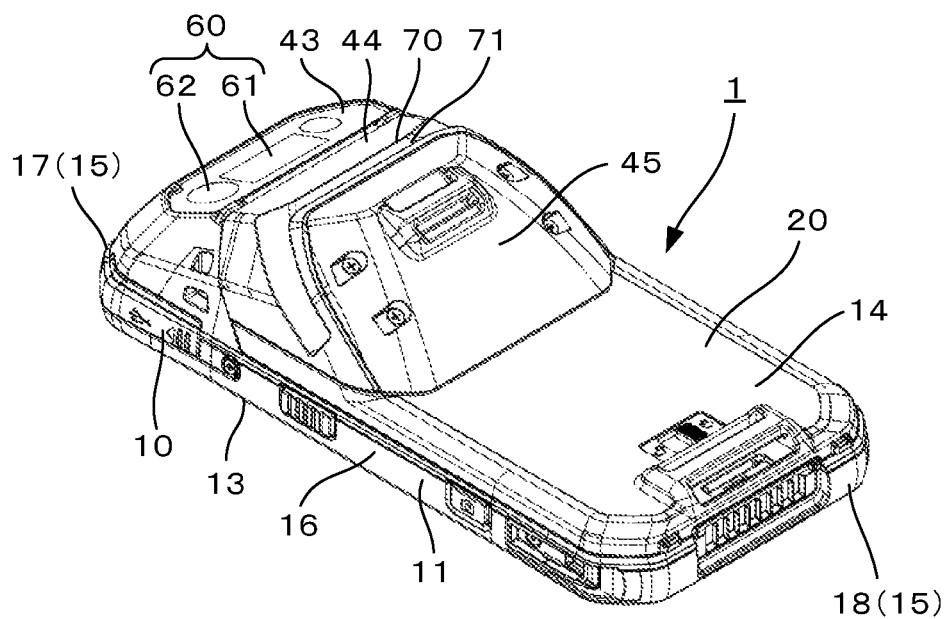
FIG. 1B is a rear perspective view illustrating the example of the electronic apparatus according to the present disclosure.
Figure 1C:
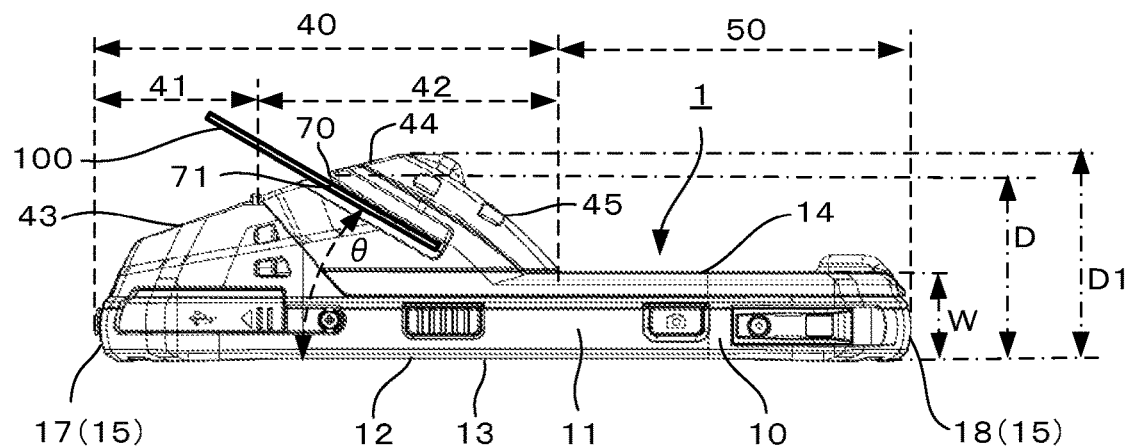
FIG. 1C is a right side view illustrating the example of the electronic apparatus according to the present disclosure.
Figure 2A:
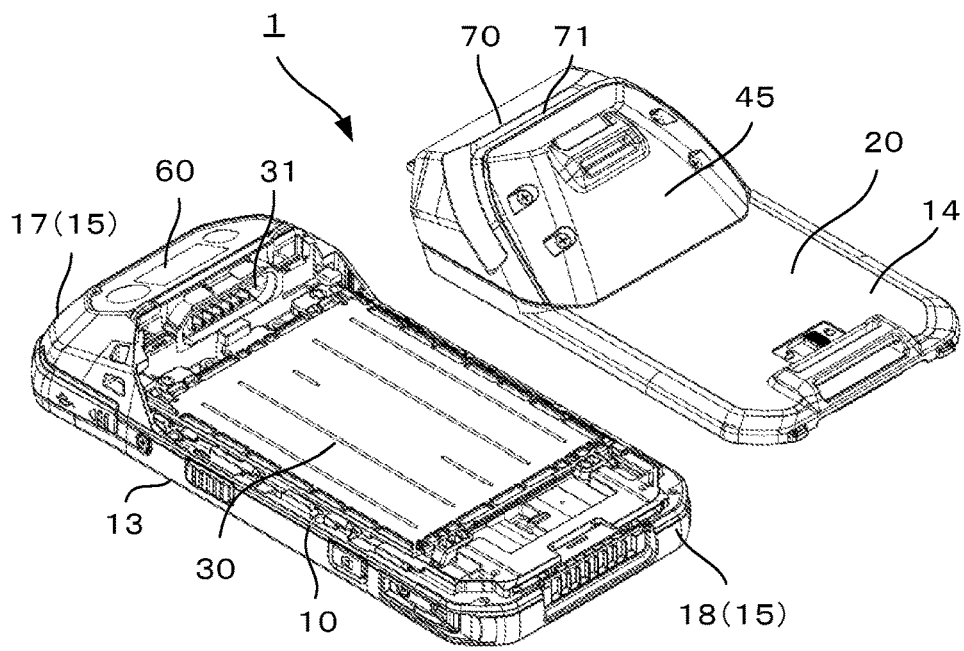
FIG. 2A is an exploded perspective view.
Figure 2B:
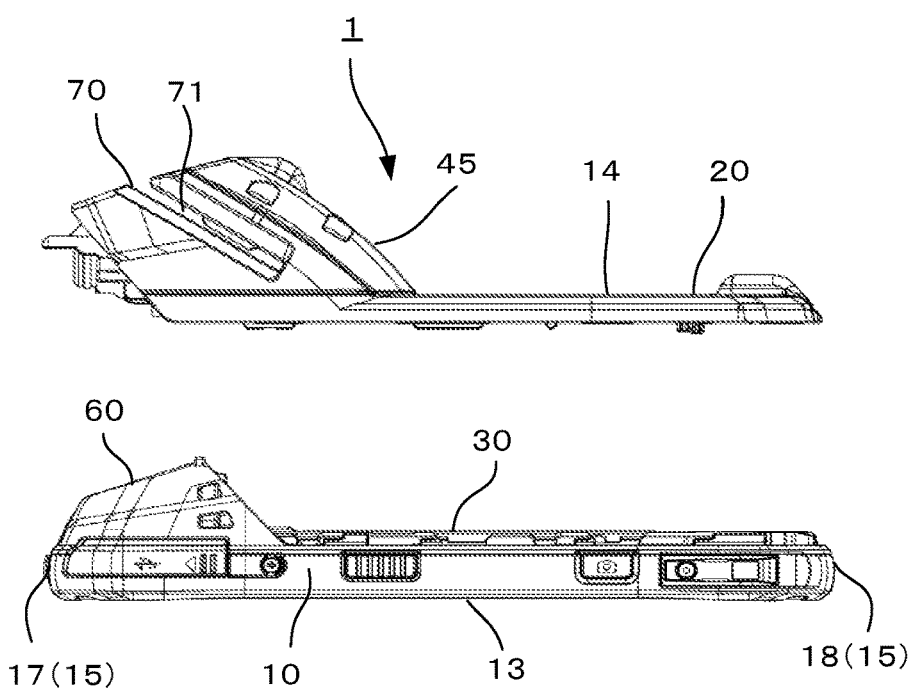
FIG. 2B is an exploded right side view, based on FIGS. 1B and 1C.
Figure 3A:
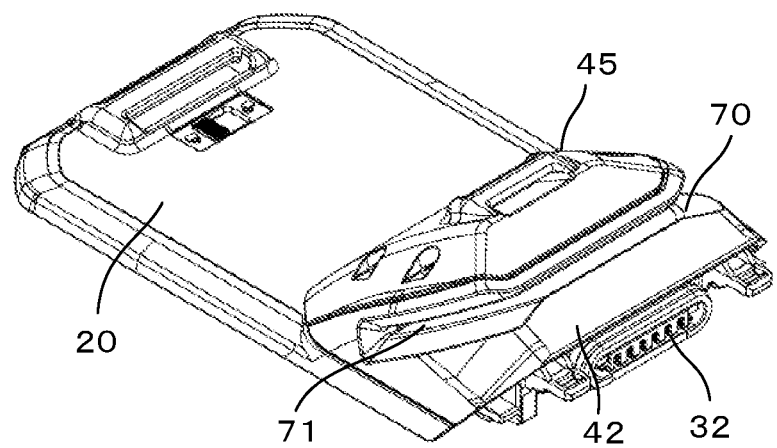
FIG. 3A is a front perspective view illustrating a lid member of the electronic apparatus according to the present disclosure.
Figure 3B:
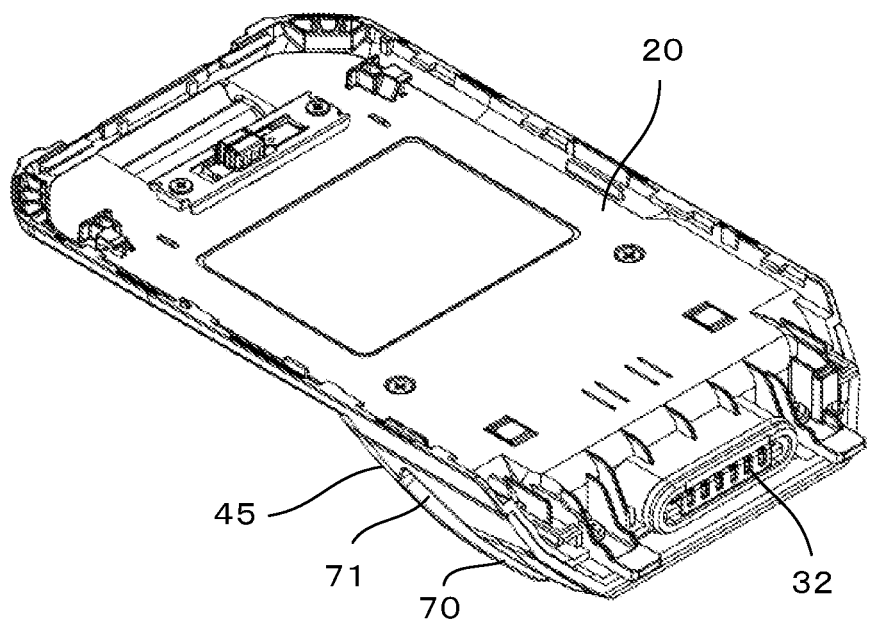
FIG. 3B is a rear perspective view illustrating the lid member of the electronic apparatus according to the present disclosure.

FIG. 1A is a front perspective view illustrating one example of an electronic apparatus according to the present disclosure, FIG. 1B is a rear perspective view illustrating the example of the electronic apparatus according to the present disclosure, and FIG. 1C is a right side view illustrating the example of the electronic apparatus according to the present disclosure. FIG. 2A is an exploded perspective view 1, and FIG. 2 is an exploded right side view, based on FIGS. 1B and 1C. FIG. 3A is a front perspective view illustrating a lid member of the electronic apparatus according to the present disclosure, and FIG. 3B is a rear perspective view illustrating the lid member of the electronic apparatus according to the present disclosure. The electronic apparatus according to the present disclosure will be described in detail with reference to FIG. 1 to FIG. 3.

Electronic apparatus 1 is a personal or business electronic apparatus, for example, a mobile phone such as a smartphone, a mobile terminal such as a tablet, a digital camera, a portable personal computer, a radio device, and includes terminal main body 10, lid member 20 removable from terminal main body 10, and battery 30 that is accommodated in terminal main body 10.

Terminal main body 10 is mainly made of a resin and is made up of substantially rectangular parallelepiped housing 11. Electronic apparatus 1 has first surface 13 on which display 12 is disposed, second surface 14 opposite to first surface 13, both end portions 15 and both side portions 16, and both end portions 15 have first end 17 and second end 18 opposite to first end 17.

From first end 17 toward second end 18, first main body 40 and second main body 50 are disposed. That is, first main body 40 is disposed on the side of first end 17, and second main body 50 is disposed on the side of second end 18. Further, in the exemplary embodiment, first main body 40 protrudes on second surface 14 side, and thickness D of first main body 40 is formed so as to be greater than thickness W of second main body 50 (D>W).

In first main body 40, first position 41 is provided so as to be adjacent to first end 17, and second position 42 is provided at the position closer to second main body 50 than first position 41 is. First position 41 is provided with first raised surface 43 to rise from first end 17, and second position 42 is provided with second raised surface 44 to be contiguous with first raised surface 43. First main body 40 is provided with inclined surface 45 which is inclined toward second main body from the largest thickness D1 portion in thickness D of first main body 40, and has a substantially triangular cross-section by first position 41 and second position 42.

That is, in second surface 14, the region of first main body 40 adjacent to second main body 50 forms inclined surface 45 which is inclined so as to be directed from second surface 14 to first surface 13 along the direction from first end 17 toward second end 18.

In electronic apparatus 1 according to the present disclosure, the side on which display 12 is disposed is defined as first surface 13, and the opposite side to first surface is defined as second surface 14. In addition, first end 17, second end 18, first main body 40, second main body 50, first position 41 and second position 42 are the terms for setting forth electronic apparatus 1 according to the present disclosure, and do not limit the present disclosure to a particular configuration.

In the exemplary embodiment, reading device 60 is provided at first position 41 of first main body 40, and magnetic card reader 70 is provided at second position 42. Reading device 60 has bar-code reader 61 and camera 62 for reading external information. Magnetic card reader 70 has slot 71 through which the magnetic stripe of magnetic card 100 passes, and is provided in second raised surface 44. That is, slot 71 is defined in a state of being inclined so as to be directed from second surface 14 to first surface 13 along the direction from first end 17 to second end 18 in first main body 40.

Although terminal main body 10 and lid member 20 are separated in the above description, terminal main body 10 and lid member 20 are integrated with each other with lid member 20 being included in terminal main body 10. In addition, it is defined that magnetic card reader 70 and slot 71 are provided in first main body 40 which has a thickness greater than that of second main body 50.

In the exemplary embodiment, slot 71 of magnetic card reader 70 is provided in a state of being inclined in first main body 40 having a thickness greater than thickness W of second main body 50, whereby it is possible to prevent the thickness from being increased due to magnetic card reader 70 of electronic apparatus 1.

The formation of slot 71 in a thickness direction makes electronic apparatus 1 thicker. In addition, if slot 71 is provided in a plane direction that is substantially orthogonal to the thickness direction, the tip of magnetic card 100 interferes with reading device 60, which results in hindrance of use of reading device 60. Furthermore, if the formation direction of slot 71 is provided on the lower side, magnetic card 100 tends to interfere with one hand holding electronic apparatus 1.

In electronic apparatus 1 according to the present disclosure, the problems described above are solved by providing obliquely inclined slot 71 so that magnetic card 100 and one hand sliding magnetic card 100 do not interfere with the other hand holding reading device 60 and electronic apparatus 1, and prevent the thickness from being increased due to magnetic card reader 70 of electronic apparatus 1.

Slot 71 is provided in an obliquely inclined state in first main body 40, but slot 71 may be defined so as to be inclined in the same direction as inclined surface 45 from second face 14, and may be provided to be parallel to inclined surface 45.

The above-mentioned "inclined in the same direction" refers to, in a more specific meaning, "along inclined surface 45" and "along a direction substantially parallel to the inclined direction of inclined surface 45", and "parallel" means "substantially parallel" and "have a width to the extent that there is no influence on manufacturing error or effect." Smooth second surface 14 is formed by continuously connecting inclined surface 45, which is provided to be inclined from first main body 40, to second main body 50, and slot 71 is provided to conform to it. In this way, inclined surface 45 is effectively utilized.

Furthermore, slot 71 may be provided so as to be inclined at angle θ of 30° to 45° with respect to first surface 13. Incidentally, angle θ has a width to the extent that there is no influence on manufacturing error or effect. When angle θ is 30° to 45°, magnetic card 100 is easily inserted into slot 71, and the interference with reading device 60 and even the other hand holding electronic apparatus 1 can be prevented.

As shown in FIG. 2, lid member 20 has a substantially rectangular shape that is made of a resin molded product or the like, is removable from terminal main body 10, and constitutes at least the region corresponding to inclined surface 45 and second main body 50 in second surface 14. In the region corresponding to first main body 40 of lid member 20, when magnetic card reader 70 is mounted, slot 71 is defined in lid member 20. Lid member 20 is also a battery lid that covers battery 30 accommodated in second main body 50 and is electrically connected with terminal portion 31 disposed between battery 30 and reading device 60.

FIG. 3 illustrates lid member 20, and on the side of second position 42 of lid member 20, engaging portion 32 connected with terminal portion 31 provided in terminal main body 10 is provided.

Figure 4:
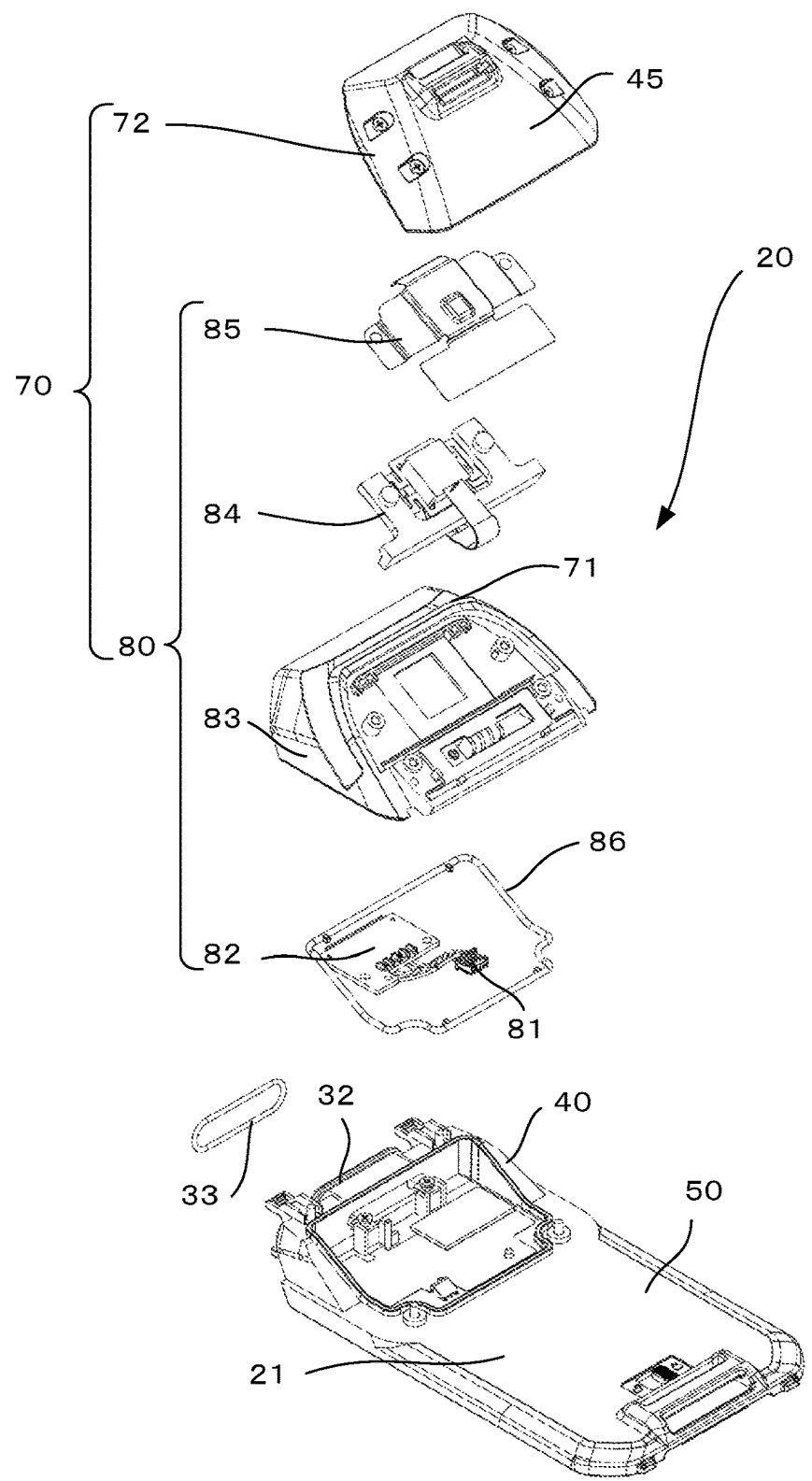
FIG. 4 is an exploded perspective view illustrating a magnetic card reader of the electronic apparatus according to the present disclosure.

FIG. 4 is an exploded perspective of the region of lid member 20 corresponding to first main body 40. Lid member 20 has main member 21 forming first main body 40 and second main body 50 except reading device 60, and magnetic card reader 70 mountable to main member 21. Further, magnetic card reader 70 has magnetic card reader module 80 and outmost lid 72 having inclined surface 45. Terminal portion 31 and engaging portion 32 are connected via seal material 33 for waterproofing.

Magnetic card reader module 80 includes board 82 having connector 81, slot defining member 83 having slot 71, magnetic head 84 for reading information on the magnetic stripe of magnetic card 100, and pressing member 85. Main member 21 and slot defining member 83 are waterproofed through packing 86.

Lid member 20 is a separate member from terminal main body 10, and has a configuration in which magnetic card reader 70 is provided in lid member 20. In this way, it is possible to reduce the difference in shape (size) between magnetic card reader 70 and the battery lid having no function, and to reduce the feeling of discomfort even when the user uses magnetic card reader 70 in combination with the battery lid having no function.

Figure 5A:
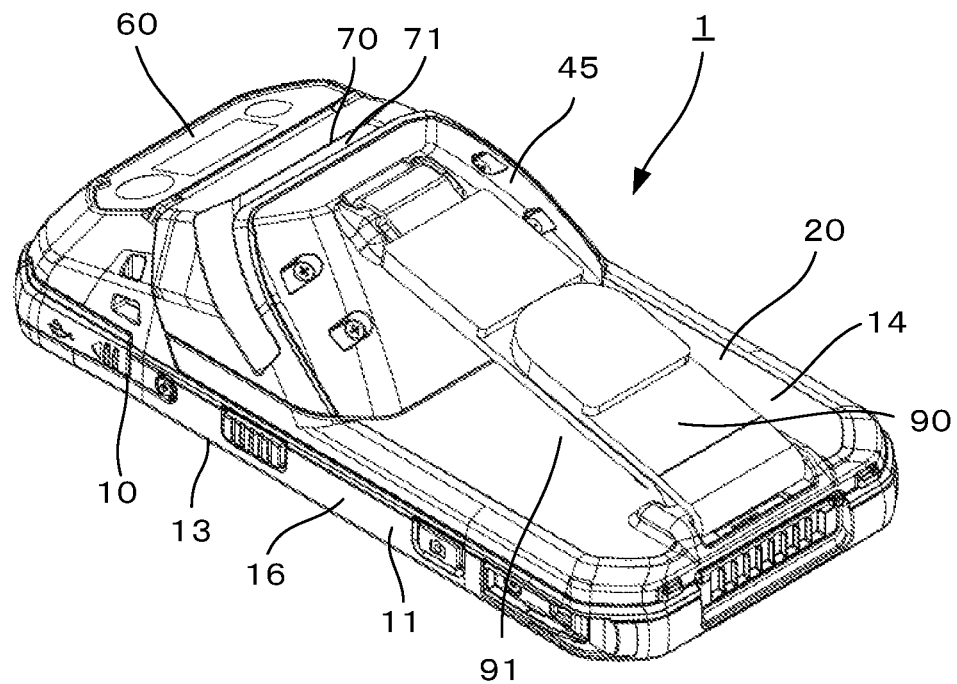
FIG. 5A is a rear perspective view illustrating a strap attached to the electronic apparatus according to the present disclosure.
Figure 5B:
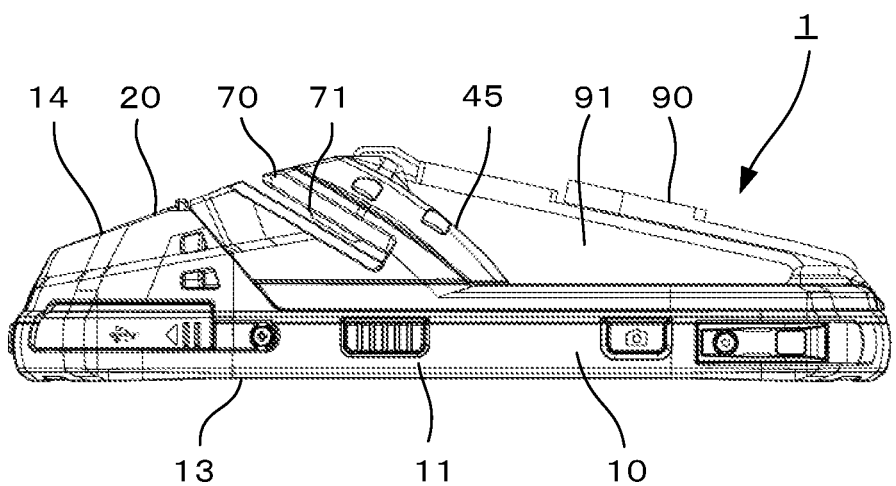
FIG. 5B is a right side view illustrating the strap attached to the electronic apparatus according to the present disclosure.

FIG. 5 illustrates that strap 90 is attached to electronic apparatus 1. Strap 90 is formed in a substantially rectangular shape and made of leather or the like, and one and the other ends of strap 90 are removably mounted to an upper end of inclined surface 45 and near second end 18, respectively. Space 91 is formed between the back surface side of strap 90 and the upper surface side of second main body 50 so as to allow the hand holding electronic apparatus 1 to pass through the space, and strap 90 prevents electronic apparatus 1 from falling from the hand.

As described above, electronic apparatus 1 of the exemplary embodiment includes terminal main body 10, reading device 60 that reads external information, magnetic card reader 70 that has slot 71 through which magnetic stripe of magnetic card 100 passes. Terminal main body 10 has first main body 40 disposed on the side of first end 17 of terminal main body 10, second main body 50 disposed on the side of second end 18 of terminal main body 10 and having a thickness smaller than that of first main body 40, and first surface 13 on which at least display 12 is disposed and second surface 14 opposite to first surface 13. Reading device 60 is provided at first position 41 adjacent to first end 17 of first main body 40, magnetic card reader 70 is provided at second position 42 closer to second main body 50 than first position 41 is in first main body 40, and slot 71 is defined in a state of being inclined so as to be directed from second surface 14 to first surface 13 along the direction from first end 17 to second end 18 in first main body 40.

This makes it possible to prevent magnetic card 100 and one hand sliding magnetic card 100 from interfering with the other hand holding reading device 60 and electronic apparatus 1, and also to prevent the thickness from being increased by magnetic card reader 70 of electronic apparatus 1.

As described above, in second surface 14 of electronic apparatus 1 of the exemplary embodiment, the region of first main body 40 adjacent to second main body 50 forms inclined surface 45 that is inclined so as to be directed from second surface 14 to first surface 13 along the direction from first end 17 to second end 18, and slot 71 is defined so as to be inclined in the same direction as inclined surface 45 from second surface 14.

This makes it possible to form smooth second surface 14 by continuously connecting inclined surface 45, which is provided to be inclined from first main body 40, to second main body 50, and provide slot 71 to conform to it, and to effectively utilize inclined surface 45.

As described above, in electronic apparatus 1 of the exemplary embodiment, slot 71 is provided to be in parallel to inclined surface 45. This makes it possible to form smooth second surface 14 by continuously connecting inclined surface 45, which is provided to be inclined from first main body 40, to second main body 50, and provide slot 71 to conform to it, and to effectively utilize inclined surface 45.

As described above, in electronic apparatus 1 of the exemplary embodiment, slot 71 is provided so as to be inclined at an angle of 30° to 45° with respect to first surface 13. This makes it easy to insert magnetic card 100 into slot 71, and makes it possible to prevent interference with reading device 60 and even the other hand holding electronic apparatus 1.

As described above, electronic apparatus 1 of the exemplary embodiment further includes lid member 20 removable from terminal main body 10, and lid member 20 constitutes at least the region corresponding to inclined surface 45 and second main body 50 in second surface 14. When magnetic card reader 70 is mounted in the lid member 20, slot 71 is defined in lid member 20. This makes it possible to provide magnetic card reader 70 and slot 71 in lid member 20 that is separate from terminal main body, and makes it easy to replace the failed magnetic card reader or to mount magnetic card reader 70 that corresponds to magnetic card 100 to be used.

As described above, in electronic apparatus 1 of the exemplary embodiment, lid member 20 is a battery lid that covers battery 30 accommodated in second main body 50. This makes it possible to reduce the difference in shape (size) between magnetic card reader 70 and the battery lid having no function is reduced, and to reduce the feeling of discomfort even when the user uses the magnetic card reader 70 in combination with the battery lid having no function.

As described above, in electronic apparatus of the exemplary embodiment, reading device 60 includes at least one of bar-code reader 61 or camera 62. This makes it easy to acquire external information.

Although the exemplary embodiment of the electronic apparatus according to the present disclosure has been described with reference to the drawings, the present disclosure is not limited to the exemplary embodiment taken above. It will be apparent to those skilled in the art that various changes, modifications, substitutions, additions, deletions, and equivalents can be conceived within the spirit and scope of the attached claims and it is to be understood that they should be considered to fall within the technical scope of the present disclosure.

The electronic apparatus of the present disclosure can be handled smoothly without interference with other devices when using the magnetic card, and is useful in the field requiring the thickness of the magnetic card reader of the electronic apparatus to be prevented.

What is claimed is:

1. An apparatus comprising:
    a terminal main body;
    a reading device that reads external information; and
    a magnetic card reader that has a slot through which a magnetic stripe of a magnetic card passes,
    wherein the terminal main body includes
        a first main body disposed on a side of a first end of the terminal main body,
        a second main body disposed on a side of a second end of the terminal main body and having a thickness smaller than that of the first main body, and
        a first surface on which at least a display is disposed and a second surface opposite to the first surface, the reading device is provided at a first position adjacent to the first end of the first main body, the magnetic card reader is provided at a second position which is closer to the second main body than the first position is in the first main body, the slot is defined in a state of being inclined so as to be directed from the second surface to the first surface along a direction from the first end to the second end in the first main body, a region of the first main body adjacent to the second main body in the second surface forms an inclined surface that is inclined so as to be directed from the second surface toward the first surface along the direction from the first end to the second end, and the slot is defined to be inclined in the same direction as the inclined surface from the second surface.

2. The electronic apparatus of claim 1, wherein the slot is provided to be parallel to the inclined surface.

3. The electronic apparatus of claim 1, wherein the slot is provided so as to be inclined at an angle of 30° to 45° with respect to the first surface.

4. The electronic apparatus of claim 1, further comprising:
a lid member that is removable from the terminal main body, wherein the lid member constitutes at least a region corresponding to the inclined surface and the second main body in the second surface, and the magnetic card reader is mounted on the lid member, and the slot is defined in the lid member.

5. The electronic apparatus of claim 4, wherein the lid member is a battery lid that covers a battery accommodated in the second main body.

6. The electronic apparatus of claim 1, wherein the reading device includes at least one of a bar-code reader or a camera.

* * * * *